US008788753B2

(12) United States Patent
DeKoning et al.

(10) Patent No.: US 8,788,753 B2
(45) Date of Patent: Jul. 22, 2014

(54) SYSTEMS CONFIGURED FOR IMPROVED STORAGE SYSTEM COMMUNICATION FOR N-WAY INTERCONNECTIVITY

(75) Inventors: Rodney A. DeKoning, Wichita, KS (US); Mohamad H. El-Batal, Boulder, CO (US); Bret S. Weber, Wichita, KS (US); William G. Deitz, Niwot, CO (US); Stephen B. Johnson, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 242 days.

(21) Appl. No.: 13/082,148

(22) Filed: Apr. 7, 2011

(65) Prior Publication Data

US 2012/0185643 A1 Jul. 19, 2012

Related U.S. Application Data

(60) Provisional application No. 61/432,739, filed on Jan. 14, 2011.

(51) Int. Cl.
G06F 12/00 (2006.01)
G06F 13/00 (2006.01)
G06F 13/28 (2006.01)

(52) U.S. Cl.
USPC ......................................................... 711/114

(58) Field of Classification Search
USPC ......................................................... 711/114
See application file for complete search history.

(56) References Cited

U.S. PATENT DOCUMENTS 6,883,065 B1 * 4/2005 Pittelkow et al. ............. 711/114
7,546,415 B2 * 6/2009 Blinick et al. ................ 711/114
7,707,136 B2 * 4/2010 Vosshall et al. ............... 707/695
7,739,416 B2 * 6/2010 Chikusa et al. ................... 710/2
8,028,191 B2 * 9/2011 Brown et al. ................ 714/6.12
2001/0049740 A1 * 12/2001 Karpoff ......................... 709/231
2007/0162592 A1 * 7/2007 Marks et al. .................. 709/224
2007/0226415 A1 * 9/2007 Holland et al. ............... 711/114
2008/0276033 A1 * 11/2008 DeCenzo et al. ............. 710/316
2011/0035605 A1    2/2011 McKean et al.
2012/0260127 A1 * 10/2012 Jibbe et al. ................... 714/6.21

OTHER PUBLICATIONS

Well et al., "CRUSH: Controlled, Scalable, Decentralized Placement of Replicated Data," Storage Systems Research Center University of California, Santa Cruz {sage, scott, elm, carlosm}@cs.ucsc.edu http://www.cs.ucsc.edu/~sage/crush, Nov. 2006.

(Continued)

Primary Examiner — Matthew Bradley
Assistant Examiner — Rocio del mar Perez-Velez
(74) Attorney, Agent, or Firm — Duft Bornsen & Fettig

(57) ABSTRACT

Storage systems configured for improved N-way connectivity among all of a plurality of storage controllers and all of a plurality of storage devices in the system. All controllers of the storage system are coupled through a switched fabric communication medium to all of the storage devices of the storage system. Thus, the back-end interface of each storage controller of the storage system is used for all communications with any of the storage devices as well as for any communications among the controllers to coordinate the N-way distribution of stored data in a declustered RAID storage environment. This use of the back-end channel for all storage controller to storage device N-way connectivity as well as controller to controller N-way connectivity eliminates the need for a dedicated inter-controller interface for such N-way connectivity and eliminates the over-utilization of a front-end (e.g., network) communication path for providing N-way connectivity in the storage system.

20 Claims, 5 Drawing Sheets

(56) References Cited

OTHER PUBLICATIONS

Sage A.Weil, "CEPH: Reliable, Scalable, and High-Performance Distributed Storage," The Dissertation of Sage A. Weil, University of California Santa Cruz, Dec. 2007.

Bo Hong et al, "Using MEMS-Based Storage in Computer Systems—MEMS Storage Architectures," ACM Transactions on Storage, vol. 2, No. 1, Feb. 2006, pp. 1-21.

Alexander Thomasian, "Storage Research in Industry and Universities," ACM SIGARCH Computer Architecture News vol. 38, No. 2, May 2010.

Guillermo A. Alvarez et al., "Declustered Disk Array Architectures with Optimal and Near-optimal Parallelism," 1998 IEEE.

Huijun Zhu et al., "Shifted Declustering: A Placement-ideal Layout Scheme for Multi-way Replication Storage Architecture," ICS'08, Jun. 7-12, 2008, Island of Kos, Aegean Sea, Greece.Copyright 2008 ACM 978-1-60558-158-3/08/06.

Mark Holland, "Parity Declustering for Continuous Operation in Redundant Disk Arrays," Proceedings of the 5th Conference on Architectural Support for Programming Languages and Operating Systems, 1992.

Alexander Thomasian, "Higher Reliability Redundant Disk Arrays:Organization, Operation, and Coding," ACM Transactions on Storage, vol. 5, No. 3, Article 7, Publication date: Nov. 2009.

Guillermo A. Alvarez et al, "Declustered Disk Array Architectures with Optimal and Near-optimal Parallelism," Published in Proc. of the 25th Annual ACM/IEEE International Symposium on Computer Architecture (ISCA'98), Barcelona, Spain, Jun. 1998.

* cited by examiner

SYSTEMS CONFIGURED FOR IMPROVED STORAGE SYSTEM COMMUNICATION FOR N-WAY INTERCONNECTIVITY

This patent claims priority to co-pending U.S. provisional patent application No. 61/432,739, filed on 14 Jan. 2011 and entitled Method for Optimizing Clustered SAS Storage Scaleout System Solutions which is hereby incorporated by reference.

BACKGROUND

1. Field of the Invention

The invention relates generally to storage systems and more specifically relates to methods and storage systems providing improved performance in a declustered storage architecture by using back-end interface communication channels for N-way connectivity among all components of the storage system.

2. Discussion of Related Art

Storage systems have evolved from simple single disk drives to highly complex storage systems incorporating hundreds or thousands of disk drives and storage management techniques to improve both performance and reliability. In general, present day RAID (Redundant Array of Independent Disks) storage management techniques define logical storage volumes comprising multiple disk drives. Storage controllers associated with the system provide RAID storage management control logic to define and manipulate logical volume mapping host system I/O requests directed to a logical volume into lower level accesses to the underlying multiple physical disk drives. Attached host systems thereby perceive a single logical storage volume that has improved performance and reliability. Transparently to the host systems, data of the logical volume is distributed or striped over multiple disk drives to improve performance and redundancy information is added to the data stored in the logical volume to improve reliability (permitting continued operation without loss of data in response to failure of a disk drive in the logical volume). Larger RAID storage systems may define multiple such logical volumes defined as fixed portions of fixed groups of disk drives in the storage system.

Newer storage paradigms provide still further enhancements by distributing data over all disk drives of the entire storage system (e.g., "declustered" storage architecture). In one current embodiment of such a paradigm, the aggregate storage capacity of all storage devices in the system is treated as a pool of available physical storage and logical volumes defined by the RAID controller may be distributed in any useful manner over any of the pool of physical storage. Each logical volume is defined, in essence, by a mapping structure that identifies where blocks of data corresponding to logical block addresses of the logical volume are stored in the storage pool that is the physical disk drives of the system. These newer data distribution techniques may serve to provide, for example, faster recovery from drive failures, greater uniformity of performance across logical volumes, or lower power requirements. For example, a method known as Controlled Replication Under Scalable Hashing (CRUSH) may distribute data blocks of any single RAID level 5 stripe over any of the storage capacity of any of the storage devices of the system. CRUSH methods and structures utilize a hierarchical cluster map representing available storage devices in order to map logical to physical addresses and to permit migration of data all transparently with respect to attached host systems. CRUSH provides for a layer of virtualization above and beyond RAID logical volumes, wherein stored data may be migrated to any subset of the hundreds or even thousands of storage devices of the system. Furthermore, using CRUSH techniques, migration may occur as an online process, without interruption of processing of host I/O requests. In general, the storage controller in a storage system using the CRUSH architecture is coupled with all of the disk drives of the system to allow the controller complete flexibility to store and migrate physical storage anywhere it deems appropriate. Mapping features map all logical addresses and logical volumes to corresponding portions of physical storage. Other declustered, distributed storage management techniques are known to those of ordinary skill in the art where data is distributed over any of the storage devices of the storage system without regard to predefined, static groupings or clustering of the storage devices.

Another storage architectural feature applied in high-performance, high-reliability storage applications employs multiple storage controllers coupled with the pool of physical storage devices. Multiple storage controllers provide added reliability in that each may serve as a backup or redundant controller for the other controllers. Further, the multiple storage controllers may also be simultaneously active to process I/O requests from attached host systems and thus may provide enhanced performance.

Utilizing the CRUSH storage methods (e.g., declustered storage management as well as other complex mapped/virtualized storage architectures) with multiple storage controllers requires that each of the multiple storage controllers be capable of communicating with each of the storage devices in the system (i.e., with each of the disk drives managed in accordance with the CRUSH storage management architecture). An architecture in which each of multiple storage controllers of the system has some form of access to each of the plurality of storage devices is sometimes referred to as "N-way" connectivity or "any-to-any" connectivity.

As presently practiced, each storage controller in a CRUSH architecture, multi-controller storage system is coupled with some subset of locally accessible disk drives through its "back-end" interface and is coupled with the other storage controllers (inter-controller connection) through some other interface of each storage controller. Since N-way connectivity is required for CRUSH storage management (as well as other complex storage techniques), the inter-controller connectivity is used in present systems to access other disk drives of the storage system that are not locally accessible to that controller (i.e., N-way connectivity is achieved through the inter-controller communications capabilities).

In some exemplary embodiments, the "front-end" interface of each storage controller may be used to communicate with attached host system and may also serve as the inter-controller communication path to enable communication with all storage devices through other controllers. Such embodiments suffer from poor performance in that the bandwidth of the communication media coupled with the front-end interface of each controller may be over-utilized. Where the front-end interface couples the storage controller to a common network also used for host system inter-connections, that "network" medium may be overutilized by adding the storage system inter-controller communications.

In other embodiments, a dedicated communication medium may be used for inter-controller communications between the storage controllers. For example, a PCI Express fabric, an Infiniband fabric, or a Fibre Channel fabric may be employed as a dedicated inter-controller communication medium for the multiple storage controllers. Such solutions add complexity (and hence cost and additional potential points for failure) to the storage system architecture. The added complexity creates problems for scaling the storage system to different application needs Thus it is an ongoing challenge to provide N-way connectivity in a storage system to permit all storage controllers of the system to access all storage devices of the system.

SUMMARY

The present invention solves the above and other problems, thereby advancing the state of the useful arts, by providing methods and systems for providing N-way connectivity between all disk drives of a storage system and all storage controllers of the system using the back-end interface of the storage controllers. A Serial Attached SCSI (SAS) fabric, a Fibre Channel (FC) fabric, or other switched fabric may be coupled with a back-end interface of every storage controller. The switched fabric back-end allows each storage controller access to every storage device (e.g., disk drive) in the system. A standard discovery process (e.g., SAS or FC discovery and configuration) of the fabric protocols to determine access paths from each controller to each disk drive. Further, where required, the back-end fabric may also be utilized for inter-controller communications to permit shipping of I/O requests for load balancing and other purposes.

In one aspect hereof, a declustered Redundant Array of Independent Drives (RAID) storage system is provided. The system comprising a plurality of storage controllers (three or more). Each controller comprises a front-end interface for coupling with host system and a back-end interface for coupling with a switched fabric communication medium. The plurality of storage controllers collectively provide declustered RAID storage management for data stored on the plurality of storage devices. The system further comprises a switched fabric communication medium coupled with the plurality of storage controllers and adapted to couple with a plurality of storage devices. Each of the plurality of storage controllers is adapted to communicate through its back-end interface with any storage device coupled with the switched fabric communication medium. Each storage controller of the plurality of storage controllers is adapted to communicate through its back-end interface with any other storage controller of the plurality of storage controllers through the switched fabric communication medium.

Another aspect hereof provides a system comprising a plurality of storage enclosures. Each storage enclosure further comprises a plurality of storage controllers each adapted to perform Redundant Array of Independent Drive (RAID) storage management. Each storage controller further comprising an inter-controller communication interface adapted to couple the storage controller to other storage controllers in the same storage enclosure and a front-end interface adapted to couple the storage controller to one or more host systems. Each storage controller further comprises a back-end interface adapted to couple the storage controller to a switched fabric communication medium. The system further comprises a switched fabric communication medium coupled with each of the plurality of storage enclosures through the back-end interface of each storage controller of each of the plurality of storage enclosures. The system further comprises a plurality of storage devices coupled with the switched fabric communication medium. Each storage controller of each of the plurality of storage enclosures is adapted to communicate through its back-end interface and the switched fabric communication medium with any of the plurality of storage devices. All storage controllers of each of the plurality of storage enclosures collectively provide declustered RAID storage management for data stored on the plurality of storage devices. Each storage controller of each of the plurality of storage enclosures is adapted to communicate through its back-end interface and the switched fabric communication medium with any other storage controller of any of the other storage enclosure of the plurality of storage enclosures through the switched fabric communication medium.

DETAILED DESCRIPTION OF THE DRAWINGS

Figure 1:
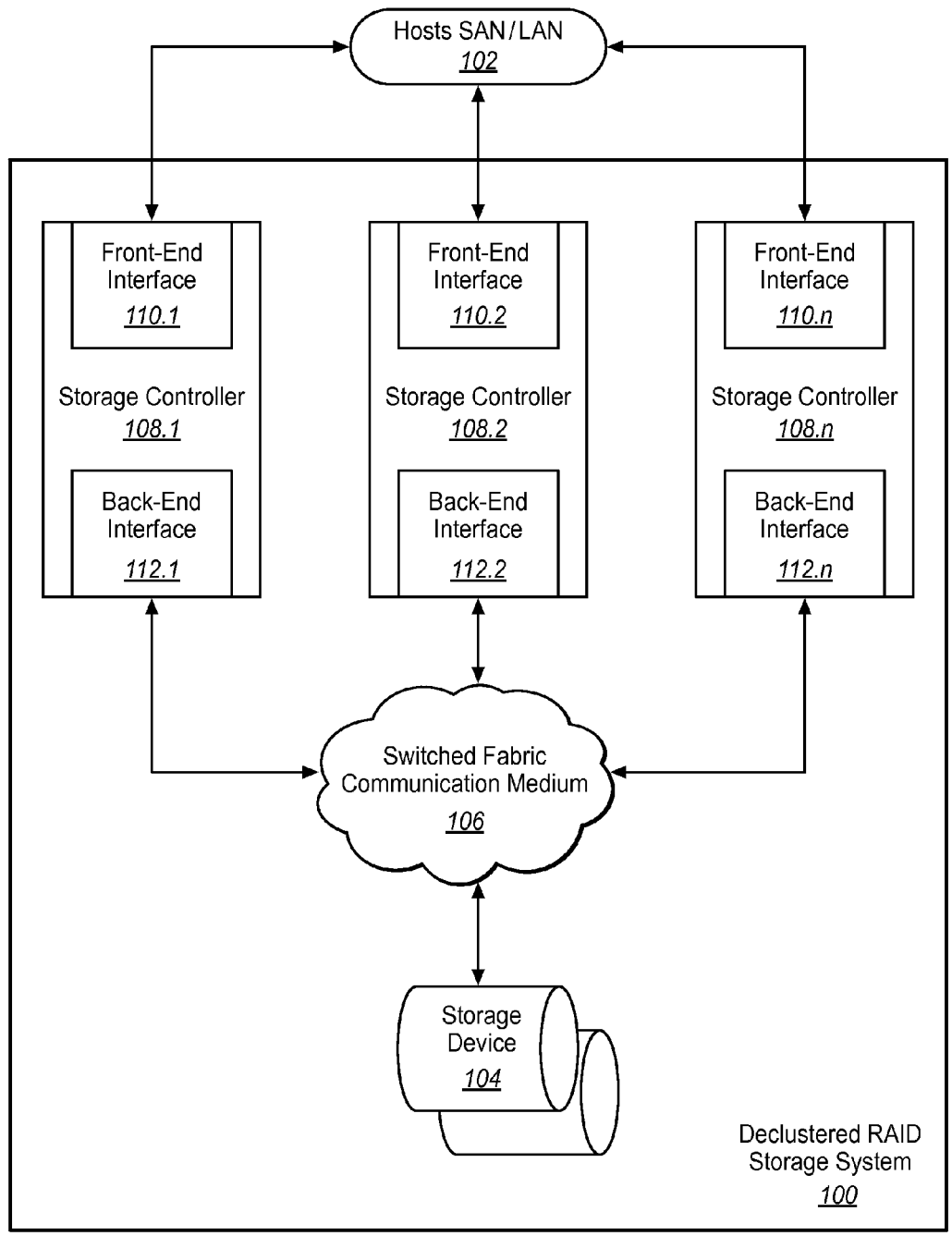
FIG. 1 is a block diagram of an exemplary storage system having a plurality of storage controllers and a plurality of storage devices coupled to provide N-way connectivity in accordance with features and aspects hereof

FIG. 1 is a block diagram of a declustered RAID storage system 100 enhanced in accordance with features and aspects hereof. System 100 comprises a plurality of storage controllers 108.1 through 108.$n$ coupling system 100 with one or more host systems 102 (through an appropriate storage network or local area network —SAN or LAN). Each of the plurality of storage controllers 108.1 through 108.$n$ is coupled through switched fabric communication medium 106 with a plurality of storage devices 104. Each storage controller 108.1 through 108.$n$ may be implemented as any suitable computing and/or electronic device adapted for reading, writing, and managing data stored on storage devices 104. Though the storage controllers may serve as redundant backups to one another, they are also all available for actively processing I/O requests received from any host systems 102. Thus, the plurality of storage controllers 108.1 through 108.$n$ may require inter-controller communication to coordinate processing of I/O requests directed to common areas of storage accessible simultaneously by multiple controllers.

Each storage controller 108.1 through 108.$n$ comprises a corresponding front-end interface 110.1 through 110.$n$ adapted for coupling each corresponding storage controller to the one or more host systems 102. Each storage controller 108.1 through 108.$n$ further comprises a corresponding back-end interface 112.1 through 112.$n$, respectively. Each back-end interface 112.1 through 112.$n$ is adapted to couple its corresponding storage controller to the switched fabric communication medium 106. Switched fabric communication medium 106 may be any suitable medium and protocol including, for example, Serial Attached SCSI (SAS) or Fibre Channel (FC). Each back-end interface 112.1 through 112.$n$ may be any suitable interface circuit including, for example, a SAS interface circuit or a Fibre Channel interface circuit.

As noted above, some declustered storage management techniques, such as the CRUSH architecture, require that each storage controller be capable of communicating with every storage device as well as with each other storage controller of the system—i.e., the CRUSH architecture with multiple storage controllers requires N-way connectivity among all storage controllers to coordinate I/O request processing and connectivity between all storage devices and any of the storage controllers. As further noted above, present storage system architectures provide for such N-way connectivity by permitting each storage controller to access its locally attached storage devices directly while accessing other non-locally attached storage devices by communications with other storage controllers that are locally attached to the other storage devices. Where such connectivity utilizes the same communication medium as is used for host communications (with other hosts and/or with the storage system), that communication medium may be overutilized thereby diminishing overall storage system performance (as well as potentially diminishing host system performance). Some prior techniques therefore utilize a dedicated communication medium interconnecting all storage controllers of the system. However, as noted earlier, this adds substantial complexity and related cost to the storage system.

By contrast, storage controllers 108.1 through 108.$n$ of system 100 provide for N-way connectivity of controllers and storage devices by utilization of back-end interface 112.1 through 112.$n$ of each controller and switched fabric communication medium 106. This N-way connectivity allows any of the plurality of storage controllers 108.1 through 108.$n$ to access any of the plurality of storage devices 104. Further, this N-way connectivity allows any storage controller to communicate with any other storage controller also utilizing the corresponding back-end interfaces and the switched fabric communication medium. Thus, system 100 of FIG. 1 enables the N-way connectivity required for declustered storage management (such as the CRUSH architecture) while reducing overutilization of bandwidth of a host communication medium and without the need for adding dedicated inter-controller communication channels.

FIG. 1 depicts an exemplary embodiment with three storage controllers and two storage devices. Some prior storage systems provided for a pair of storage controllers (two) configured to communicate with one another through their respective back-end interfaces. These communications were generally limited to minimal messaging as required for redundant assumption of control by one controller when the other controller is sensed to have failed. However, such prior system did not provide for full N-way connectivity among any number of controllers and storage devices so as to enable declustered storage management (e.g., CRUSH architecture). Those of ordinary skill in the art will readily recognize that any number of such storage controllers (three or more) and any number of storage devices may be interconnected through the switched fabric communication medium subject only to the limitations of the particular communication medium and protocols. In addition, the multiple controllers may provide for redundancy among the various controllers and redundant communication paths with the fabric. Redundant fabrics may also be provided as desired for a high reliability application. Thus the simple embodiment represented by FIG. 1 may be scaled to a variety of larger configurations. Still further, those of ordinary skill in the art will readily recognize numerous additional and equivalent elements that may be present in fully functional storage systems. Such additional and equivalent elements are all made it herein for simplicity and brevity of this discussion.

Some present storage systems are built from pre-packaged storage system components that allow flexibility in scaling a storage system from a simple RAID configuration to much larger, more complex N-way connected storage systems. The prepackaged components are referred to herein as "enclosures" or "storage enclosures". Each enclosure may comprise some common power, cooling, and backplane components that enable simple configuration of a storage system building block by simply plugging in storage related modules. Modules in such enclosures may include storage controllers, storage devices, switched fabric communication modules, etc. as well as combinations of such modules. By interconnecting such enclosures as building blocks, large, complex storage systems may be more easily configured.

Figure 2:
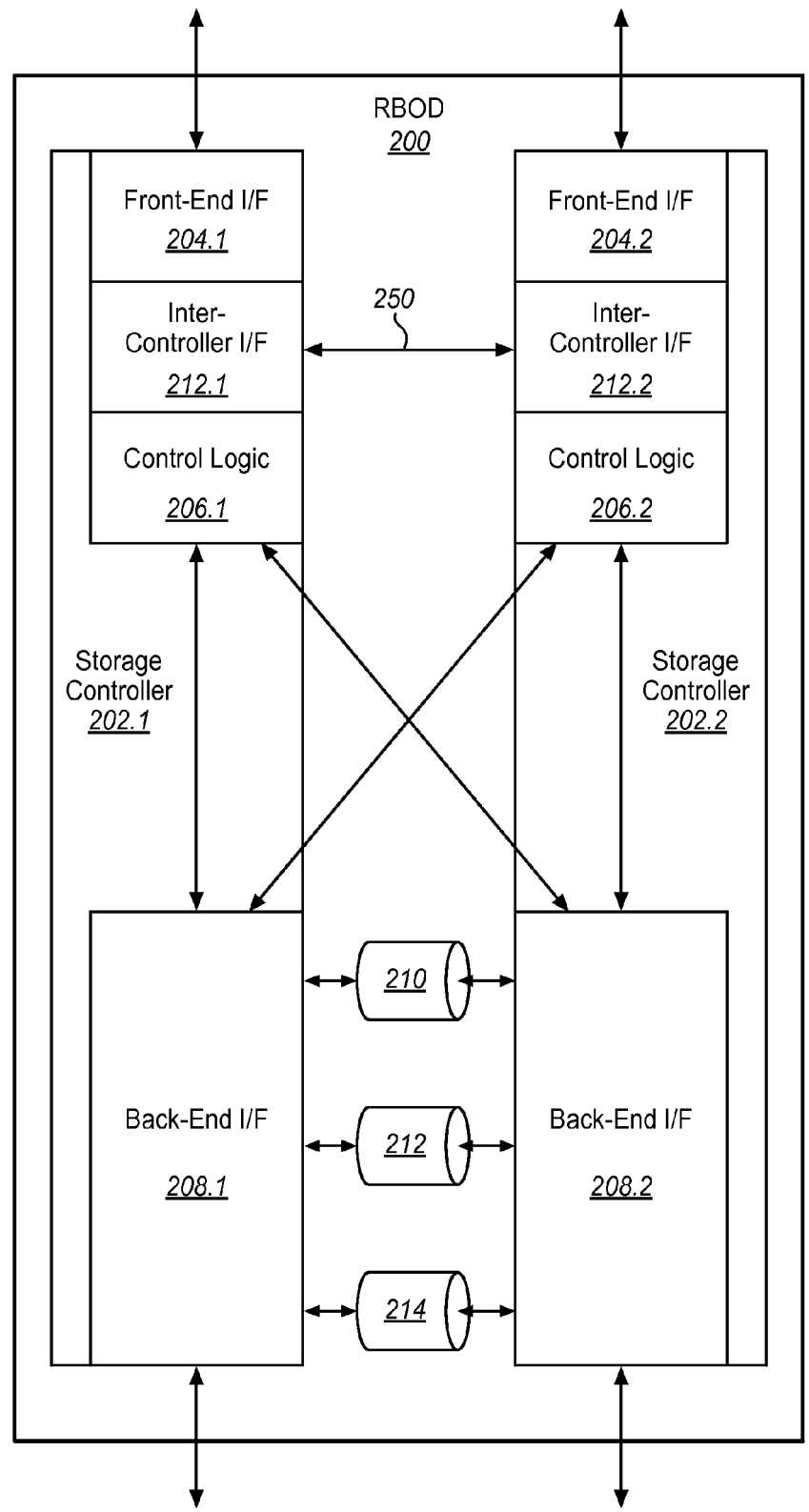
FIGS. 2, 3, and 4 are block diagrams of exemplary storage enclosure modules useful as building blocks to configure larger storage systems having N-way connectivity among all components of the system in accordance with features and aspects hereof

FIG. 2 is a block diagram describing an exemplary embodiment of a storage enclosure RBOD 200 (RAID Box of Disks) enhanced in accordance with features and aspects hereof and useful as a building block for configuring large, declustered, storage systems. RBOD 200 represents a module that may be used in a standalone configuration as a simple, smaller RAID storage system or may be used as a module configured with other storage enclosure modules in a larger storage system configuration.

RBOD 200 comprises a plurality of redundant storage controllers 202.1 and 202.2. Controllers 202.1 and 202.2 are essentially identical storage controllers coupled with one another to provide redundancy in case of failure of one of its mates among the multiple storage controllers (or failure of any storage controller in a system comprising one or more RBODs 200 or other storage controllers). In the exemplary embodiment of FIG. 2, all of the multiple storage controllers (202.1 and 202.2) are interconnected via path 250 through a respective inter-controller interface (212.1 and 212.2). Inter-controller interfaces 212.1 and 212.2) and path 250 may provide any of a variety of well known communication protocols and media including, for example, PCI (e.g., PCI Express), SAS, Fibre Channel, Infiniband, Ethernet, etc. This inter-controller interface and medium is typically utilized only for exchanges between the controllers (202.1 and 202.2) within the storage enclosure. Controller to controller communications relating to the redundancy and associated watchdog signaling may be applied to this inter-controller interface and the communication medium.

Each controller 202.1 and 202.2 comprises control logic 206.1 and 206.2, respectively. Control logic 206.1 and 206.2 represent any suitable circuits for controlling overall operation of the storage controller 202.1 and 202.2, respectively. In some exemplary embodiments, control logic 206.1 and 206.2 may be implemented as a combination of special and/or general purpose processors along with associated programmed instructions for each such processor to control operation of the storage controller. For example, control logic 206.1 and 206.2 may each comprise a general purpose processor and associated program and data memory storing programmed instructions and data for performing distributed storage management on volumes dispersed over all storage devices of the storage system that comprises RBOD 200. Control logic 206.1 and 206.2 interact with one another through inter-controller interfaces 212.1 and 212.2, respectively, to coordinate redundancy control and operation. In such a redundant configuration, each controller 202.1 and 202.2 monitors operation of the other controller to detect a failure and to assume control from the failed controller. Well known watchdog timer and control logic techniques may be employed in either an "active-active" or an "active-passive" redundancy configuration of the storage controllers 202.1 and 202.2.

Further, each of the multiple storage controllers 202.1 and 202.2 comprises a corresponding front-end interface 204.1 and 204.2, respectively, coupled with the control logic 206.1 and 206.2, respectively. Front-end interfaces couple their respective storage controller (202.1 and 202.2) with one or more host systems. In some exemplary, high reliability applications, front-end interfaces 204.1 and 204.2 may each provide multiple, redundant communications paths with any attached host system.

Each of the multiple storage controllers 202.1 and 202.2 also comprises a corresponding back-end interface 208.1 and 208.2, respectively. Each back-end interface comprises an appropriate circuit for coupling either of storage controllers 202.1 and 202.2 to a switched fabric communication medium. In general, back-end interfaces 208.1 and 208.2 may be switching devices that form a part of the switched fabric communication medium. However, physically, back-end interfaces 208.1 and 208.2 are integrated within the storage enclosure RBOD 200. In such exemplary embodiments, control logic 206.1 and 206.2 may further comprise interface circuits adapted to couple the control logic with the fabric as represented by the back-end interfaces 208.1 and 208.2. These and other design choices regarding the level of integration among control logic 206, inter-controller interfaces 212, front-end interfaces 204 and back-end interfaces 208 will be readily apparent to those of ordinary skill in the art.

In some exemplary embodiments, the switched fabric communication medium may be a SAS switched fabric. In such an embodiment, each back-end interface 208.1 through 208.2 may be a SAS expander circuit substantially integrated with its respective storage controller 202.1 and 202.2 within storage enclosure RBOD 200. As noted above, in such an embodiment, control logic 206.1 and 206.2 may further comprise an appropriate SAS interface circuit (i.e., a SAS initiator circuit) for coupling with the back-end interfaces of SAS expanders 208.1 and 208.2, respectively.

In another exemplary embodiment, the switched fabric communication medium may be a Fibre Channel switched fabric and each back-end interface 208.1 and 208.2 may be a Fibre Channel switch substantially integrated with its respective storage controller 202.1 and 202.2 within the storage enclosure RBOD 200. Such Fibre Channel switches couple corresponding storage controllers 202.1 and 202.2 to other components of the Fibre Channel switched fabric communication medium. Also as noted above, in such an embodiment, control logic 206.1 and 206.2 may further comprise appropriate FC interface circuits to couple with respective back-end FC switches 208.1 and 208.2.

In some embodiments, storage enclosure RBOD 200 comprises locally attached storage devices 210, 212, and 214. Such storage devices may be multi-ported (e.g., dual-ported) such that each storage device couples to all back-end interface circuits 208.1 and 208.2 integrated with corresponding storage controllers 202.1 and 202.2 within the enclosure RBOD 200. These storage devices 210, 212, and 214 are directly attached through back-end interfaces 208.1 and 208.2 to the switched fabric communication medium (e.g., attached through SAS expanders or Fibre Channel switches 208.1 and 208.2 with the remainder of the switched fabric communication medium).

Figure 3:
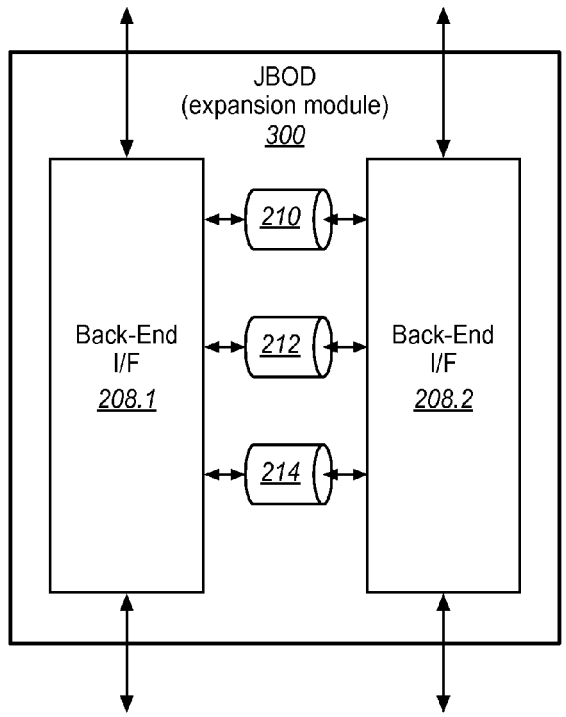
Figure 4:
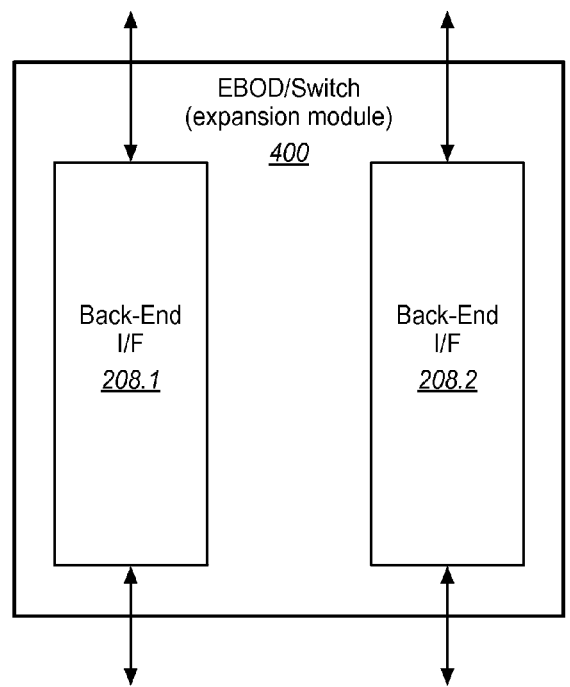

FIGS. 3 and 4 depict other exemplary storage enclosure modules comprising building blocks for larger, declustered storage systems. In particular, FIG. 3 depicts an exemplary expansion storage module as a JBOD (Just a Box of Disks) 300. JBOD 300 comprises back-end interfaces 208.1 and 208.2 described above as well as locally attached storage devices 210, 212, and 214 as described above. In essence, JBOD 300 is similar to RBOD 200 of FIG. 2 but devoid of front-end interface, inter-controller interface, and control logic components. Any control of the storage capacity of JBOD 300 is performed by an external storage controller accessing the storage devices (210, 212, and 214) via the switched fabric communication medium via back-end interface 208.1 or 208.2.

FIG. 4 depicts another expansion storage module as EBOD 400 (i.e., a switch for the switched fabric communication medium and protocol). EBOD 400 comprises back-end interfaces 208.1 and 208.2 similar to the structure of JBOD 300 but devoid of any locally attached storage devices (210, 212, or 214 of FIGS. 2 and 3). EBOD 400 allows other RBOD and/or JBOD modules to be interconnected to the common switched fabric communication medium so as to provide any-to-any ("N-way") connectivity between any of the storage controllers and any of the storage devices of the storage system.

As noted above, the switched fabric communication interconnections through back-end interfaces 208 of the various storage enclosure modules (200, 300, and 400 of FIGS. 2, 3, and 4) may provide, for example, a SAS fabric communication medium or an FC fabric communication medium. The SAS expanders (208.1 and 208.2) or FC switches (208.1 and 208.2) of FIG. 2, 3, or 4, provide the desired N-way connectivity between all storage devices and all storage controllers. By contrast with prior structures and methods, the N-way connectivity as required for declustered RAID storage management (such as a CRUSH architecture storage system) is provided in the exemplary embodiments through the back-end interfaces of each storage controller. All storage controller to storage controller communication among the various storage enclosure modules is performed through the back-end interfaces of each storage controller and the switched fabric coupling all controllers. Further, all storage controller to storage device communications are similarly directed through the back-end interfaces of each storage controller, via the switched fabric communication medium, to any of the storage devices in the storage system.

Those of ordinary skill in the art will recognize various additional and equivalent elements that may be present in fully functional storage enclosure modules 200, 300, and 400. Such additional and equivalent elements are well known to those of ordinary skill in the art and are omitted herein for brevity and simplicity of this discussion. Further, those of ordinary skill in the art will recognize that any number of controllers and storage devices may be configured in such storage enclosure modules. Thus, the particular number of controllers, corresponding back-end interfaces, and storage devices shown in FIGS. 2, 3, and 4 are intended merely as exemplary of possible embodiments.

Figure 5:
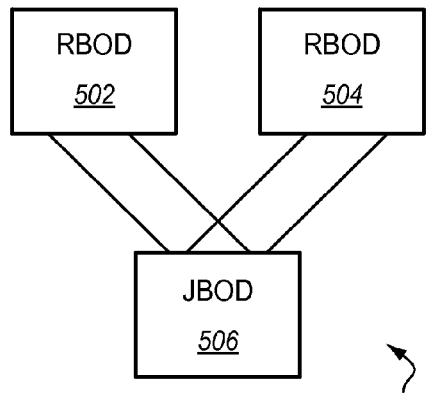
FIGS. 5, 6, 7, and 8 are block diagrams of exemplary storage systems configured using the exemplary storage enclosure modules of FIGS. 2, 3, and 4 to provide N-way connectivity among all components of the system in accordance with features and aspects hereof.

Utilizing the storage enclosure modules exemplified in FIGS. 2 through 4, FIGS. 5 through 8 depict exemplary storage system embodiments adapted to provide declustered storage management utilizing back-end communication interfaces and switched fabric media of the various modules. In particular, FIG. 5 depicts an exemplary storage system 500 comprising RBOD 502 and RBOD 504 storage enclosures coupled with a common JBOD 506 expansion storage enclosure. The various storage enclosure modules (502, 504, and 506) are all coupled utilizing the back-end interfaces of the various storage enclosure modules thereby forming a switched fabric communication medium providing N-way connectivity among all storage controllers and storage devices of system 500. In particular, both RBOD 502 and RBOD 504 can access their respective storage devices locally coupled to the switched fabric within the enclosures. In addition, because the switched fabric within each RBOD is coupled (through JBOD 506) to form a common switched fabric, both RBODs 502 and 504 have access to the other RBOD's storage devices and controllers and have access to the storage devices within JBOD 506.

Figure 6:
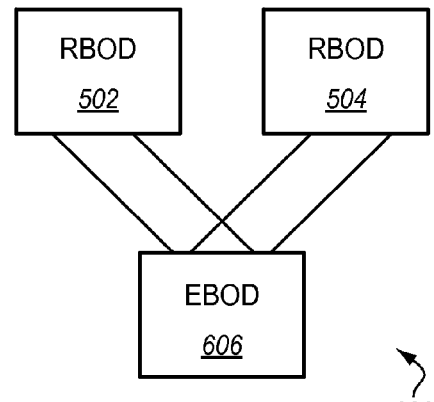

FIG. 6 shows a similar system 600 in which RBODs 502 and 504 are interconnected through the switched fabric communication medium by their respective connections with communication switches of EBOD 606. Since EBOD 606 joins the switched fabrics within RBODs 502 and 504, each RBOD 502 and 504 has access to its own locally integrated storage devices and to the storage devices locally coupled within the other RBOD.

Figure 7:
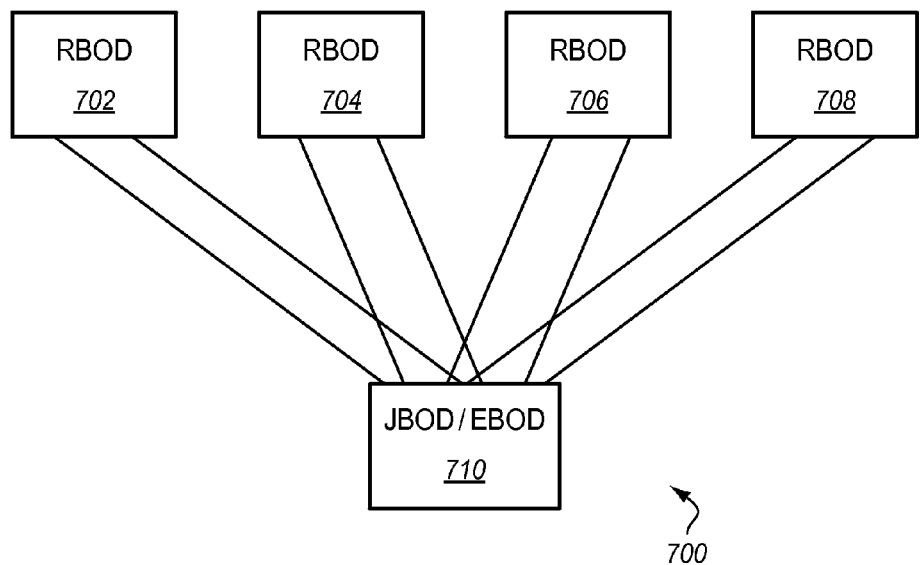

FIG. 7 depicts yet another exemplary system 700 built from the storage enclosure modules described in FIGS. 2 through 4. System 700 shows an exemplary embodiment in which four RBODs 702 through 708 are all coupled through module 710 (e.g., a JBOD or EBOD) to provide N-way connectivity among all storage controllers and storage devices of system 700.

As suggested by FIGS. 5 through 7, any number of such storage enclosure modules may be coupled in such a manner such that every storage controller may access any of the storage devices of the system through the back-end interface of that storage controller and the switched fabric communication medium coupled with the back-end interface. In addition, in such configurations, any storage controller of the system may communicate with any other storage controller of the system through their respective back-end interfaces coupled via the switched fabric communication medium.

Where a larger number of storage enclosure modules are present in a storage system it is possible that the back-end interfaces of the various modules could be overwhelmed by the communications between storage controllers and storage devices that are not locally attached within the module. In particular, if a large number of RBODs are configured in a system all coupled to the fabric through a single JBOD/EBOD, the number of storage devices directly accessible to each storage controller without routing exchanges through the common JBOD/EBOD is limited. Thus, in such a "flat" configuration, the back-end communication interface of each RBOD could be utilized too frequently for accessing other storage devices (outside of the storage enclosure) by routing exchanges through the common JBOD/EBOD.

Figure 8:
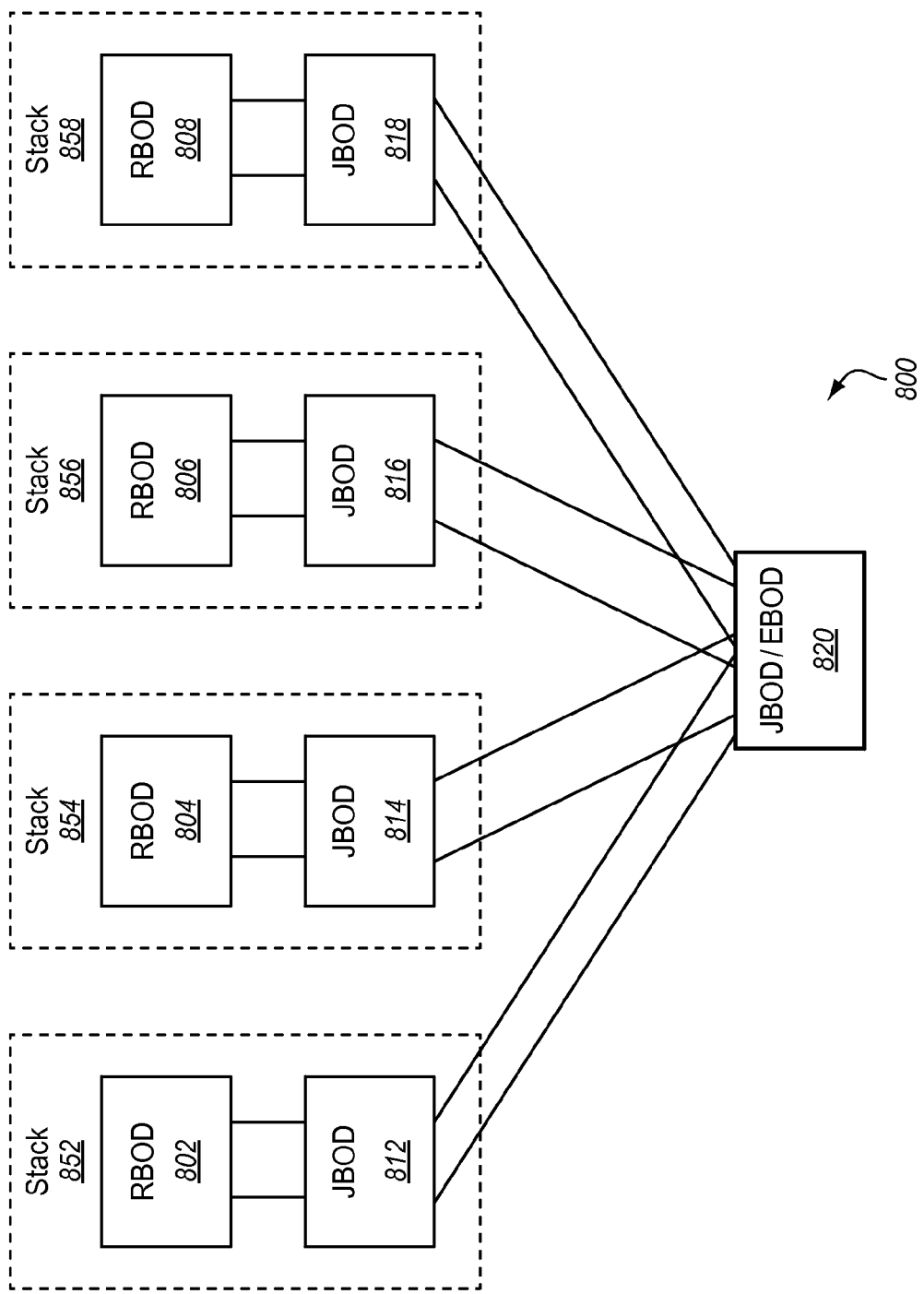

A variety of hierarchical storage system topologies and configurations using the exemplary enclosure modules will be readily apparent to those of ordinary skill in the art to reduce the potential for such over-loading of the back-end interfaces of the various modules. FIG. 8 depicts an exemplary system 800 configured in a manner to help reduce overutilization of the back-end interfaces of the storage controllers to access storage devices of other RBODs. System 800 comprises a plurality of "stacks" (852 through 858) where each stack comprises an RBOD and one or more JBODs coupled to the RBOD. The stacks are then coupled through a common JBOD/EBOD 820 coupled with the fabric of each stack to join all stacks into a common switched fabric communication medium.

For example, stack 852 comprises RBOD 802 coupled with JBOD 812, stack 854 comprises RBOD 804 coupled with JBOD 814, stack 856 comprises RBOD 806 coupled with JBOD 816, and stack 858 comprises RBOD 808 coupled with JBOD 818. Any number of additional JBODs may be added to each "stack" such that the RBOD of the stack has access to all the storage devices in the RBOD and JBODs of its stack without accessing other stacks through the common JBOD/EBOD 820. The "depth" of each stack (i.e., the number of storage enclosure modules in each stack) determines the number of storage devices that may be accessed by the storage controllers within the stack without access to the storage devices of other stacks (through the common fabric connection of JBOD/EBOD 820). This and other exemplary topologies help reduce the overloading of communications exchanged through the common enclosure 820 coupling all the fabrics of all the stacks into a common switched fabric communication medium providing the required N-way connectivity. A system administrator may determine desired tradeoffs in the depth of each stack versus the width of the system (i.e., the number of stacks coupled with the common JBOD/EBOD 820) to optimize performance of system 800 for a particular application.

The maximum number of storage enclosure modules and the number of controllers and storage devices within each enclosure is limited only by the limitations of the underlying switched fabric communication medium and protocols. As noted above, in some exemplary embodiments, a SAS fabric may be used for coupling all enclosures, controllers and storage devices. In other exemplary embodiments, FC fabric may couple all the components of the system. Each of these exemplary embodiments provides for a corresponding limitation on the number of devices and enclosures based on the requirements of the corresponding protocol specification (e.g., addressing limitations etc.).

Those of ordinary skill in the art will readily recognize that, though not shown, the ROBDs of FIGS. 5 through 8 may be connected with any number of host systems via their respective front-end interfaces. Further, though not specifically labeled in FIGS. 5 through 8, the common switched fabric communication medium in each system configuration comprises the various back-end interfaces within each of the storage enclosure modules and the various interconnections among those back-end interfaces. As further noted above, the switched fabric communication medium and the corresponding back-end interfaces may comprise, for example, a SAS fabric or an FC fabric.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A declustered Redundant Array of Independent Drives (RAID) storage system comprising:

a plurality of storage controllers wherein each controller comprises a front-end interface for coupling with a host system and a back-end interface for coupling with a switched fabric communication medium, wherein the plurality of storage controllers collectively provide declustered RAID storage management for data stored on a plurality of storage devices, and wherein the plurality of storage controllers comprises three or more storage controllers;

wherein the switched fabric communication medium is coupled with the plurality of storage controllers and is adapted to couple with the plurality of storage devices, wherein each of the plurality of storage controllers is adapted to communicate through its back-end interface with any storage device coupled with the switched fabric communication medium, and wherein each storage controller of the plurality of storage controllers is adapted to communicate all inter-controller communications through its back-end interface with any other storage controller of the plurality of storage controllers through the switched fabric communication medium.

2. The system of claim 1 further comprising:
a plurality of storage devices each coupled through the switched fabric communication medium with each of the plurality of storage controllers.

3. The system of claim 1
wherein the switched fabric communication medium is a Serial Attached SCSI (SAS) fabric communication medium.

4. The system of claim 3
wherein the SAS fabric further comprises a plurality of SAS expanders each associated with a corresponding storage controller of the plurality of storage controllers,
wherein each SAS expander is adapted to couple with one or more SAS storage devices,
wherein each of the plurality of storage controllers is adapted to couple with any SAS storage devices coupled with the SAS fabric.

5. The system of claim 4 further comprising:
a plurality of SAS storage devices coupled with each of the plurality of SAS expanders.

6. The system of claim 1
wherein the switched fabric communication medium is a Fibre Channel (FC) fabric communication medium.

7. The system of claim 6
wherein the FC fabric further comprises a plurality of FC switches each associated with a corresponding storage controller of the plurality of storage controllers,
wherein each FC switch is adapted to couple with one or more FC storage devices,
wherein each of the plurality of storage controllers is adapted to couple with any FC storage devices coupled with the FC fabric.

8. The system of claim 7 further comprising:
a plurality of FC storage devices coupled with each of the plurality of FC switches.

9. A system comprising:
a plurality of storage enclosures wherein each storage enclosure further comprises:
 a plurality of storage controllers each adapted to perform Redundant Array of Independent Drive (RAID) storage management each storage controller further comprising:
  an inter-controller communication interface adapted to couple the storage controller to other storage controllers in the same storage enclosure;
  a front-end interface adapted to couple the storage controller to one or more host systems; and
  a back-end interface adapted to couple the storage controller to a switched fabric communication medium;
a switched fabric communication medium coupled with each of the plurality of storage enclosures through the back-end interface of each storage controller of each of the plurality of storage enclosures; and
a plurality of storage devices coupled with the switched fabric communication medium,
wherein each storage controller of each of the plurality of storage enclosures is adapted to communicate through its back-end interface and the switched fabric communication medium with any of the plurality or storage devices,
wherein all storage controllers of each of the plurality of storage enclosures collectively provide declustered RAID storage management for data stored on the plurality of storage devices, and
wherein each storage controller of each of the plurality of storage enclosures is adapted to communicate all inter-controller communications through its back-end interface and the switched fabric communication medium with any other storage controller of any of the other storage enclosures of the plurality of storage enclosures through the switched fabric communication medium.

10. The system of claim 9
wherein the switched fabric communication medium is a Serial Attached SCSI (SAS) fabric communication medium.

11. The system of claim 10
wherein the SAS fabric further comprises a plurality of SAS expanders integrated within each storage enclosure, each of the plurality of SAS expanders coupled with a corresponding storage controller of the storage enclosure in which the SAS expander is integrated.

12. The system of claim 11
wherein each storage enclosure further comprises:
a plurality of storage devices each coupled with the plurality of SAS expanders integrated within said each storage enclosure.

13. The system of claim 9
wherein the switched fabric communication medium is a Fibre Channel (FC) fabric communication medium.

14. The system of claim 13
wherein the FC fabric further comprises a plurality of FC switches integrated within each storage enclosure, each of the plurality of FC switches coupled with a corresponding storage controller of the storage enclosure in which a SAS expander is integrated.

15. The system of claim 14
wherein each storage enclosure further comprises:
A plurality of storage devices each coupled with the plurality of FC switches integrated within said each storage enclosure.

16. The system of claim 11
wherein the system implements Controller Replication Under Scalable Hashing (CRUSH) storage management on the plurality of storage devices.

17. A declustered Redundant Array of Independent Drives (RAID) storage system comprising:
a switched fabric communication medium;
a plurality of RAID storage controllers where each storage controller comprises a front-end interface for coupling the controller with one or more host systems and comprises a back-end interface coupling the controller with the switched fabric communication medium, wherein the plurality of storage controllers comprises three or more storage controllers;
a plurality of storage devices coupled with the switched fabric communication medium,
wherein the system is N-way connected in that all of the plurality of storage controllers communicate with one another exclusively through the switched fabric communication medium and their respective back-end interfaces and in that all of the plurality of storage controllers are coupled through the switched fabric communication medium and their respective back-end interfaces to all of the plurality of storage devices.

18. The system of claim 17
wherein the switched fabric communication medium further comprises a plurality of interconnected Serial Attached SCSI (SAS) expanders.

19. The system of claim 18
wherein each of the plurality of SAS expanders is a self-configuring SAS expander.

20. The system of claim 17 wherein the switched fabric communication medium further comprises a plurality of interconnected Fibre Channel switches.

* * * * *